United States Patent [19]
Webster

[11] Patent Number: 4,874,235
[45] Date of Patent: Oct. 17, 1989

[54] STEREOSCOPIC VIEWING SYSTEM AND METHOD

[76] Inventor: John A. Webster, 2077 Dike Rd., Mt. Vernon, Wash. 98273

[21] Appl. No.: 121,441

[22] Filed: Nov. 17, 1987

[51] Int. Cl.$^4$ ............................ A61B 3/08; G02C 1/00
[52] U.S. Cl. ...................................... 351/201; 351/158
[58] Field of Search ............... 351/201, 202, 158, 221; 350/131, 130, 133, 143, 145, 146; 362/103

[56] References Cited

U.S. PATENT DOCUMENTS 3,439,972  4/1969  Ratliff .................................. 350/131
4,740,836  4/1988  Craig ................................ 351/175 X

FOREIGN PATENT DOCUMENTS 1103961  4/1961  Fed. Rep. of Germany ...... 351/158

*Primary Examiner*—Rodney B. Bovernick
*Attorney, Agent, or Firm*—Christensen, O'Connor, Johnson & Kindness

[57] ABSTRACT

An apparatus and method for displaying and viewing full field-of-vision stereoscopic images is disclosed. The apparatus includes left and right display components including curved screens. The screens are suitable for mounting in a fixed position relative to the viewer's head and close to the viewer's eyes. The screens provide the normal single-eye full field of vision of 120° vertically and 180° horizontally. Each screen has a spherical central surface and a cylindrical temporal surface that extends from the central surface along the side of the viewer's head. The screens are mounted close to the viewer's eyes and optical components are provided to cause the viewer's eye to be focused at the central surface. Contact lenses are suitable optical components. Contact lenses do not limit the viewer's field of vision and are continually oriented with the movements of the viewer's eyes.

11 Claims, 3 Drawing Sheets

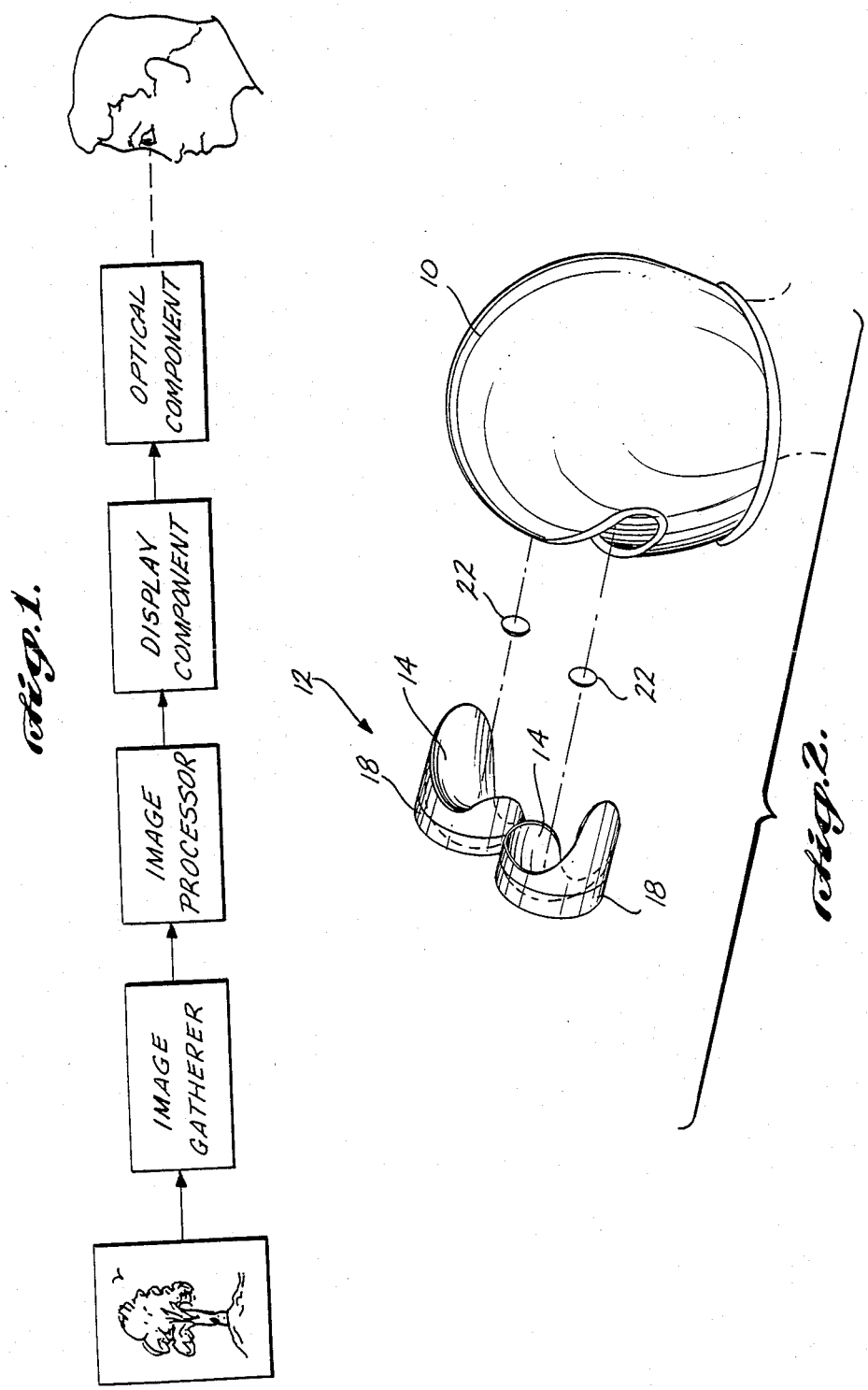

STEREOSCOPIC VIEWING SYSTEM AND METHOD

GOVERNMENT RIGHTS

This invention was made with government support under Contract DAAH01-87-C-0817 awarded by the Defense Advanced Research Projects Agency. The government has certain rights in this invention.

FIELD OF THE INVENTION

The present invention relates to an apparatus and method for viewing stereoscopic images. More particularly, the present invention uses contact lenses to adjust the relative focal point of the viewer to the central surface of a closely mounted curved screen that displays images across the full field of vision of the viewer.

BACKGROUND OF THE INVENTION

Three-dimensional viewing systems are rapidly developing, due to the vast areas in which such technology is useful. The duplication of normal visual perception has applications in the areas of: undersea (submersible) maintenance and search equipment; robotics; high-security surveillance; hazardous materials handling; entertainment; training simulator technologies; and education, to name a few. The goal of such systems is to substitute a computer-generated, recorded, or real-time remote reality for the user's current reality. Such systems may include audio, visual, and motion inputs to the user in order to create a total experience. The video aspect of such systems is known as stereoscopic viewing. Stereoscopy provides two views, i.e., a left and a right view, that are integrated by the viewer to give the impression of viewing three-dimensional objects.

The quality of stereoscopic systems depends largely on the field of vision presented to the viewer, clarity of the images, correctness of the colors and intensity of the images. A normal full field of vision for an adult can be defined by the area of visual attention coupled with the area of peripheral vision. The area of visual attention is that field in which the eye can maintain attention and sharp focus. For a single average eye this area spans about 120° vertically and horizontally in front of the eye. The area of peripheral vision extends from the area of attention along the temporal periphery and enhances the perception of the area of attention. For a single average eye, peripheral vision allows an additional 60° of vision along the horizontal plane. For purposes of this application, it will be assumed that an area spanning 120° vertically and 180° horizontally defines a full field of vision for an average adult. The clarity, color, and intensity of the images displayed for viewing should be nearly equal to those of the real images that are being depicted.

Stereoscopic systems include three major components: image-gathering; image-processing; and presentation. For example, a conventional movie camera often serves as the image-gathering component. The image-processing component would then be the equipment and methods for retaining the images on film, i.e., film development. The presentation component could then be a movie screen and any viewer optical systems necessary for creating proper viewer perception. The present invention is related to a presentation component useful in a stereoscopic viewing system.

An example of a stereoscopic system is anaglyphic 3-D. The presentation component of an anaglyphic 3-D system consists of a screen and colored lenses worn by the viewer. The images displayed on the screen are left and right images that are projected through colored filters, i.e., a red and a blue filter, and superimposed on the screen. Conventionally, the colored lenses worn by the viewer coincide with the colored filters and thus separate the left and right views. The color-filtering lenses are mounted in eyeglass-type frames. In this manner, the left images are filtered into the left eye and the right images are filtered into the right eye, with all other images being blocked from view. Such a system suffers from the inability to achieve full and true image color, the reduction of image brightness, and the need for a true display system, i.e., clear screen display, to alleviate "ghosts" created by transient color surrounding the displayed images. Additionally, the field of vision in the described system is limited by the dimensions of the viewing glasses and the dimensions of the screen display.

A similar two-display system is the field sequential system. In such a system, the display, i.e., screen image, alternates between left and right images rather than superimposing them upon one another. The presentation component includes polarized, color-filtering, or piezoelectric glasses. The lenses are synchronized with the screen display. The synchronization causes the glasses to allow only left eye vision when the left image is displayed, and only right eye vision when the right image is displayed. Drawbacks in such a system include flickering of the images if a high number of frames per second is not achieved, loss of image intensity, and possible limited field of vision as a result of the use of eyeglass-type lenses and limited screen dimensions.

Certain stereoscopic viewing systems have replaced viewing glasses with special optics. One such system utilizes separate left and right LCD television screens mounted in a helmet in front of each eye. Wide-angle binocular optics are situated between the viewer and the screens. The optics are required to ensure that the left and right images properly overlap and are brought into focus. Image intensity is reduced in the optical system due to diffraction. Additionally, orientation of the viewer's eyes with the optics must be correct to avoid losing the images at the exit pupils and to avoid obstruction of the images by the lens frame.

Certain of the above-noted problems have been addressed in the area of recorded imaging. For example, the video industry has extended the display field of vision using multiple video screen displays, thereby increasing the illusion of reality by providing a wider field of vision. However, this particular solution may be inapplicable to real-time viewing because the uses for the stereoscopic technologies differ so widely. For example, a very small stereoscopic system is desirable for flight technology, i.e., an astronaut should be equipped with a helmet-mounted display rather than a large standard projection screen for viewing activities outside a space capsule.

As noted, in present stereoscopic viewing systems, images are generally dim because of the reduction in light intensity due to color and optical filtering; true color is difficult to achieve; full field of vision is not provided; and viewer orientation requirements are often restrictive. One result of these drawbacks is that an altered total visual reality is not achieved. Such a total visual reality would present images to a viewer, causing the viewer to accept those images as "real" and thus completely replacing the viewer's actual reality. An example of total versus a partial alteration in reality can be illustrated using holographic 3-D. If a holographic image of a glass is projected on a table, then the viewer's actual reality is only partially altered, since the surrounding environment remains the same. However, if it were possible to holographically project new furniture and walls along with the glass, and all existing furniture and walls were masked, then the viewer's actual reality would be altered. Clues such as screen edges, dimness, color alterations, eyepiece edges, and orientation requirements all have a negative effect on a stereoscopic system's ability to create a total visual reality completely distinguishable from the viewer's actual reality. The present invention provides the means for creating total visual reality, while it overcomes the abovenoted problems and others in the prior art.

SUMMARY OF THE INVENTION

An apparatus and method for displaying and viewing stereoscopic images is provided. In one embodiment, the apparatus includes a display component that is a part of an individualized viewing system. The images to be displayed are gathered and processed as left and right images that are differentiated on the display component. Curved left and right screens are used as the display component. The screens are positioned in close proximity to the viewer's eyes and securely mounted to maintain proper orientation with respect to the viewer's head. An optical component in the viewing system causes the focal length of the eyes of the viewer to be focused on the surface of the central portion of the screen. Thus, while the viewer's eyes are relaxed, i.e., still focused in infinity, the screen images are clearly focused in the viewer's full range of vision. In accordance with the present invention, the optical component is a pair of frameless lenses that are always properly oriented with respect to the movement of the viewer's eyes. This prevents loss of images due to any exit pupil in the optical component and due to obstruction caused by the frames.

In another embodiment of the optical component, left and right contact lenses are used to shorten the focal length of the viewer's eyes. The diopter is chosen for each lens in the pair, depending on the individual viewer's normal eyesight. Throughout the present application, it can be assumed that the viewer has perfect 20/20 vision. In that case, lenses of 30 diopters would focus the eyes at a point very close, i.e., within 1.31 inches, of the eye. In turn, the screen is mounted and dimensioned so as to be positioned at the focal point of the viewer's eyes. One skilled in the field of ophthalmology or optometry can determine the lens strength requirements for various natural vision characteristics coupled with the distance from the eye to the screen surface. Contact lenses, as the optical component, do not limit the viewer's normal field of vision. Thus, when a full field of vision is presented to the viewer by the display component, a full field of vision can be perceived. Contact lenses are also always correctly oriented in relation to the viewer's eyes.

In accordance with another aspect of the invention, the display component is made up of left and right screens that provide the full field of vision to the viewer. The full field of vision is defined by the area of visual attention and the area of peripheral vision. For purposes of this application, the full field of vision will be described by a 120° vertical and 180° horizontal area.

The left and right screens are symmetrical about a horizontal axis extending forward from a point between the viewer's eyes. The left screen will be described, with the understanding that the right screen preferably has equal dimensions. The left screen is composed of central and temporal surfaces, which form a continuous screen. The central surface is spherical with a radius R. The central surface arcs 120° along the vertical plane, and 120° along the horizontal plane. The projected images obtained from an image-processor are aligned on the screen so that the projections are centered with the centerline of the viewer's vision. Thus, if the screen's center is slightly shifted from exact centerline of vision due to the viewer's head configuration, the center of projection is altered to provide clearly focused images at the viewer's centerline of vision.

The screen temporal surface is an extension of the central surface along the temporal side of the device in relation to the viewer. The surface is curved with a similar radius R. The side surface tapers to a point along the side of the head so that a 180° horizontal arc is formed by the screen between the inner nasal edge of the central surface and the outermost point of the temporal surface. Thus, the normal full field of vision, estimated as 180° horizontal and 120° vertical, is provided to each eye.

In accordance with still another aspect of this invention, two methods can be used to determine a suitable radius for the screen surfaces. The first is described above, wherein a reasonably strong diopter is chosen and the focal length of a person wearing a contact lens with that strength is calculated. The radius of the screen is then equal to the calculated focal length. The diopter must be chosen to provide a short enough focal length, and thus radius, so that the screens do not physically or optically interfere with one another. Alternatively, the radius of the screen is chosen to be slightly less than one-half of the viewer's interpupillary distance. The contact lens diopter is then determined so that the focal length equals the radius. The latter method provides left and right screens that comfortably fit on the viewer's face without physically or optically interfering with one another. The radius is also adjusted for other facial characteristics, such as nose size, etc.

In accordance with further aspects of this invention, the screens are formed from optic fibers. The optic fibers are coherently bundled. One end of the optic fiber bundle is connected to a device, such as a CRT, used to transmit images. At the opposite end, the fiber ends are cut and polished to provide a concave screen configuration that provides the full field of vision to the viewer. In this manner, flat displays such as those transmitted by the CRT, are transformed into curved displays. The optic fiber ends are polished and coated with a single layer of glass micro-beads. The micro-beads act to diffuse the light exiting the optic fiber surfaces so that light that would have otherwise exited at an angle away from the viewer's vision is directed toward the centerline of vision.

As will be readily appreciated from the foregoing description, the invention provides the presentation component for a stereoscopic viewing system. The invention includes a display and an optical component. The full field of vision is available to the user because the optical component does not limit the viewer's natural eye movements, and does not have a frame edge or exit pupil. Thus, when coupled with the curved screen that displays an image spanning the viewer's full range of view, a total visual reality is achieved. By securely positioning the screen in proper orientation adjacent the viewer's eyes, the displayed images are presented to the viewer without disruption caused by movement of the viewer's head. Additionally, the methods for dimensioning the screens ensures that the left and right image displays do not optically interfere with one another, as well as ensuring that the display components do not physically interfere with one another. The brightness of the images obtained from the image processor is maintained by the screen surface and the optical component, and image colors are retained, since the optical component does not require color filtering to differentiate between left and right images.

BRIEF DESCRIPTION OF THE DRAWINGS

The foregoing and other advantages and features of this invention will become more readily appreciated as the same becomes better understood by reference to the following detailed description when taken in conjunction with the accompanying drawings, wherein:

FIG. 1 is a block diagram of a stereographic viewing system of which the present invention is a component;

FIG. 2 is an exploded pictorial view of a stereographic viewing system in which the present invention is a component;

DETAILED DESCRIPTION OF THE PREFERRED EMBODIMENT

Figure 3:
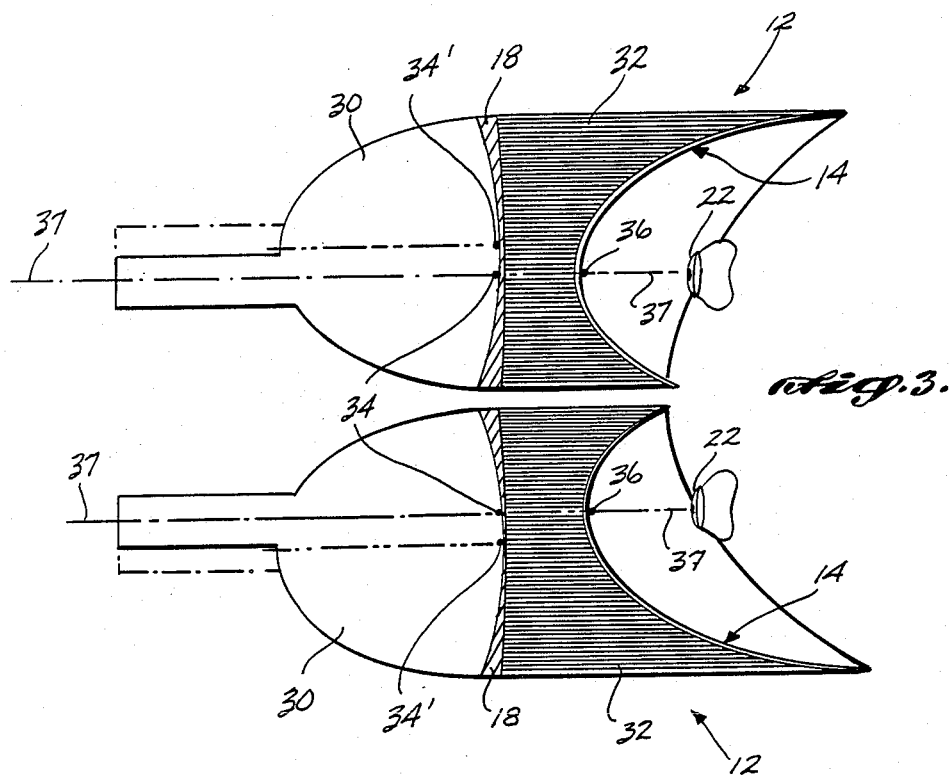
FIG. 3 is a schematic cross-sectional view along a horizontal line of the display and viewing components of one preferred embodiment of the present invention.

The components of a stereoscopic imaging system are illustrated in FIG. 1. Left and right images are gathered by the image gatherer using left and right cameras mounted at a set distance apart. The left and right images are processed by an image processor. The images are then displayed in a manner that continues to differentiate between the left and right images. An optical component is positioned between the display component and the viewer to properly focus the displays. The display and optical components of the present invention have left and right sides to be used in conjunction with the left and right eyes of the viewer.

FIG. 2 illustrates one preferred embodiment of the display and optical components in a stereoscopic system. Single reference numbers will be used throughout the present description to identify equivalent left and right components. It is to be understood that subreferences (a) and (b) refer to left and right components, respectively. The stereoscopic system is integrated into helmet 10. The display component 12 is securely mounted within the helmet. The display component 12 includes screens 14. Screens 14 are thus positioned in close proximity to the viewer's eyes when the helmet is worn. The display component 12 receives image information from an image processor (not shown) at interfaces 18. The optical component is a pair of contact lenses 22 to be worn by the viewer. The helmet 10 aids in blocking external indications of actual reality from viewer perception and in maintaining the relative orientation of the screens with respect to the viewer's head. Other devices for carrying out these functions could be used.

FIG. 3 shows the display and optical components of a preferred embodiment of the invention in a schematic view of a horizontal cross section of the components. The display component 12 is made up of optic fiber bundles 32 and screens 14. The optical component is contact lenses 22.

A pair of video display fiber-optic-face CRTs 30 interface with the optic fiber bundles 32 at interfaces 18. The flat images carried by the CRTs 30 are thus transferred to the optic fiber bundles 32 at interfaces 18. The optic fibers 32 terminate opposite interfaces 18 in screens 14.

The CRTs' centerlines 34 and the screens' centerlines 36 are aligned with the centerlines of vision 37, which are defined by known characteristics of the human eye. The centering of the CRTs' centerlines 34 is preferably done by mechanically offsetting the video display CRT inputs as shown. An alternative embodiment utilizes symmetrical CRT inputs shown in reference with centerlines 34'. In the alternative embodiment, the images at interfaces 18 are electronically adjusted in order to align the image centers with the screens' centerlines 36.

The surfaces of screens 14 are formed by smooth grinding of the optic fiber ends. The optic fiber ends are then coated with a single layer of glass microbeads (not shown). The glass micro-bead layer is applied by coating the fiber ends with a highly viscous coating, spraying the glass micro-beads onto the coating, and blowing off the excess beads so as to leave a single layer of beads clinging to the optic fiber ends. The viscous coating preferably has no capillary attraction with the microbeads to prevent more than a single layer of the glass micro-beads from adhering to the fiber ends. The glass bead diameter is preferably less than or equal to 7 microns.

Figure 4:
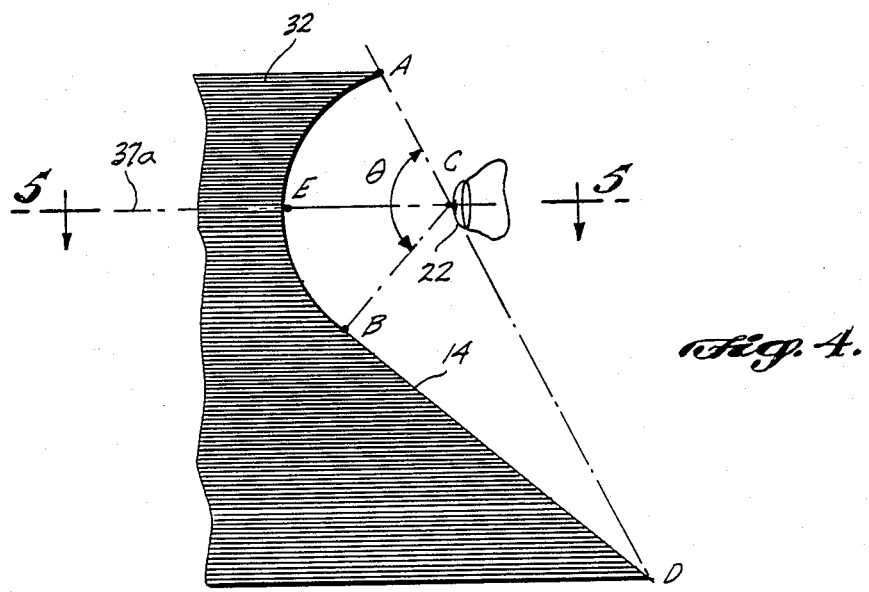
FIG. 4 is a horizontal cross-sectional view of the display component in accordance with the present invention, with the cross-sectional plane including the centerline of vision.
Figure 5:
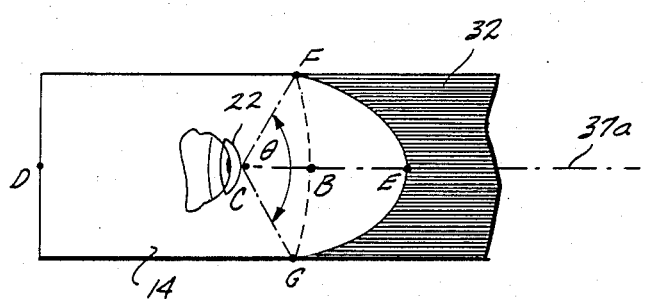
FIG. 5 is a side elevational view of a cross section of the display component in accordance with the present invention, with the cross-sectional plane including the centerline of vision.

The geometry of the screens 14 is illustrated in FIGS. 4 and 5. The below-described dimensions of the lenses provide a viewer with an interpupillary distance of about 2.37 inches, with the full field of vision as gathered by the image-gathering component. The dimensions of one preferred embodiment of the screens will be described in terms of left screen 14(a). It is to be understood that right screen 14(b) is similarly dimensioned.

FIG. 4 is a cross-sectional top view of the left screen 14(a), cut along a horizontal plane including centerline of vision 37(a). The central surface of the screen between points A and B is spherical with a radius of 1.31 inches. The angle $\theta$ formed between lines AC and CB is 120°. In the preferred embodiment, line EC bisects angle ACB. Line BD is a straight line. It represents a line bisecting the length of the cylindrical temporal surface with a similar radius of 1.31 inches. The temporal surface of the screen terminates at D. The angle formed by lines AC and CD is 180°. Thus, the full horizontal field of vision is provided to the viewer.

FIG. 5 is a cross-sectional side view of the left screen 14(a), cut along a vertical plane including centerline of vision 37(a). The cross section of the screen between F and G is spherical with a radius of 1.31 inches. FG is the line of intersection of the central surface and the temporal surface of screen 14(a). The angle $\theta$ formed by lines FC and CG is 120°, 60° above and below the centerline of vision 37(a). Thus, screen 14(a) provides the full 120° vertical field of vision to the viewer. The side surface extends temporally with a constant radius of 1.31 inches, from FG to terminate at D.

For the viewer with an interpupillary distance of about 2.37 inches, screens 14 with radii of 1.31 inches can be mounted side by side and in front of the viewer's eyes without interfering with one another or with the viewer's nose. The interpupillary distance for the average American adult is 2.36 to 2.71 inches. Thus, screens for the average person would have radii between 1.1 and 1.3 inches. It is to be understood that the radii of the screens can vary beyond this average range, depending on facial characteristics such as nose size and interpupillary distance.

The optical lenses 22 for use in conjunction with the screens 14 are single contact lenses. The lenses are of adequate strength to adjust the viewer's natural focal length to equal the radius of the central curved surface. This correction to the natural focal length is accomplished by using a converging lens, which in effect moves the projected images farther from the eyes to a point where a sharp retinal image can be formed. For a person with normal eyesight, i.e., 20/20 vision, for a screen with radius equal to 1.31 inches, a lens of 30 diopters would be appropriate. Such a correction will bring the screen into focus, while the viewer's eyes remain relaxed and focused at infinity. Methods for determining the proper lens strength and for manufacturing such lenses are known.

While preferred embodiments of the invention have been illustrated and described, it will be appreciated that various changes can be made therein without departing from the spirit and scope of the invention. For example, curved screen systems other than fiber-optic screens could be used. A fiber-optic screen without the glass micro-bead coating could be used if the optic fibers are of a high enough numerical aperture to cause the light being transmitted to diffuse normally toward the eye. Additionally, screens of different dimensions, i.e., a single closely mounted wraparound screen, could be used if a means, e.g., colored contact lenses, were used to distinguish left and right images. The CRT could be replaced by imaging systems such as liquid crystal displays. Finally, the correction provided by the contact lenses should be specific for each user of the system. Thus, if the user is naturally farsighted, the lens will compensate for that characteristic, while still providing for the proper focal point in relation to the positioning of the screens.

The embodiments of the invention in which an exclusive property or privilege is claimed are defined as follows:

1. Apparatus for the viewing of stereoscopic images by a viewer, the apparatus being used in conjunction with contact lenses that cause the viewer's eyes to be closely focused, comprising:
   image display means including means for receiving signals representative of left and right images, left and right concave display surfaces, each surface having a display center, and means for displaying said left and right images on said display surfaces; and
   mounting means for closely mounting said display surfaces at fixed positions relative to the viewer's head such that the viewer's centerlines of vision are aligned with said display centers, whereby the viewer's eyes are focused on said display surfaces.

2. The apparatus for the viewing of stereoscopic images as claimed in claim 1, wherein said left and right display surfaces each include a central surface, a temporal surface and a temporal edge, said central surface being spherical with radius R, spanning the full field of visual attention, and including said display center, and said temporal surface being a continuous cylindrical extension of said central surface toward said temporal edge of said display surface, having radius R, and spanning the full field of peripheral vision.

3. The apparatus for the viewing of stereoscopic images as claimed in claim 2, wherein said image display means is comprised of optic fibers.

4. The apparatus for the viewing of stereoscopic images as claimed in claim 3, wherein said left and right display surfaces are optic fiber ends coated with a single layer of glass micro-beads.

5. Apparatus for the viewing of stereoscopic images by a viewer, comprising:
   image display means including means for receiving signals representative of left and right images, left and right concave display surfaces, each surface having a display center, and means for displaying said left and right images on said display surfaces;
   mounting means for closely mounting said image display means at fixed positions relative to the viewer's head such that the viewer's centerlines of vision are aligned with said display centers; and
   nonobstructive optical means for focusing the viewer's eyes at said display surfaces.

6. The apparatus for the viewing of stereoscopic images as claimed in claim 5, wherein said optical means is a pair of contact lenses.

7. The apparatus for the viewing of stereoscopic images as claimed in claim 6, wherein said left and right display surfaces each include a central surface, a temporal surface, and a temporal edge, said central surface being spherical with radius R, spanning the full field of visual attention, and including said display center, and said temporal surface being a continuous cylindrical extension of said central surface toward the temporal edge of said image display means, having radius R, and spanning the full field of peripheral vision.

8. The apparatus for the viewing of stereoscopic images as claimed in claim 7, wherein said image display means is comprised of optic fibers.

9. The apparatus for the viewing of stereoscopic images as claimed in claim 8, wherein said left and right display surfaces are optic fiber ends coated with a single layer of glass micro-beads.

10. A method for the viewing of stereoscopic images by a viewer, the steps of said method comprising:
    receiving signals representative of left and right images;
    displaying said left and right images on left and right concave display surfaces, each of said surfaces having a display center;
    closely mounting said display surfaces at fixed positions relative to the viewer's head and adjacent the viewer's eyes such that the viewer's centerlines of vision are aligned with said left and right display centers; and
    viewing said images through nonobstructive optical means, said means altering the focal point of the viewer's eyes such that the viewer's eyes are focused at said display surfaces.

11. The method as claimed in claim 10, further comprising determining the dimensions for said display surfaces and the position at which said display surfaces should be mounted relative to the viewer's eyes, said step comprising:
- measuring the interpupillary distance of the viewer;
- choosing a radius R less than or equal to one-half the interpupillary distance of the viewer;
- configuring each of said display surfaces with a central surface, a temporal surface, and a temporal edge, said central surface being spherical with said radius R, and spanning the full field of visual attention, and said temporal surface being a continuous cylindrical extension of said central surface extending toward said temporal edge and spanning the full field of peripheral vision; and
- positioning said display surfaces such that the distance between the viewer's eyes and said display surfaces is equal to said radius R.

* * * * *